(No Model.)

L. DRESCHER.
ELECTRIC BATTERY.

No. 525,491. Patented Sept. 4, 1894.

Attest:
A. N. Jesbera
A. Stader

Inventor:
Luis Drescher
by William B. Greeley
Atty.

UNITED STATES PATENT OFFICE.

LUIS DRESCHER, OF NEW YORK, N. Y.

ELECTRIC BATTERY.

SPECIFICATION forming part of Letters Patent No. 525,491, dated September 4, 1894.

Application filed March 23, 1894. Serial No. 504,780. (No model.)

*To all whom it may concern:*

Be it known that I, LUIS DRESCHER, of the city, county, and State of New York, have invented certain new and useful Improvements in Electric Batteries; and I do hereby declare that the following is a full and exact description thereof, reference being had to the accompanying drawings, and to the figures of reference marked thereon, making a part of this specification.

It is well known that all galvanic cells, whether they have a fluid electrolyte or are of the so called "dry" variety, must not be sealed up tightly but must have a sufficient vent to permit the escape of the gases given off, lest they should burst and suffer loss of their contents. It is consequently common to perforate the cap or cover of a "dry" cell to permit the escape of gases, but when such a cell is turned upon its side or end for end there will be more or less escape of the fluid or semi-fluid electrolyte from the absorbent material saturated with it, such leakage being due partly to gravitation but principally to the pressure of the accumulating gases. Consequently the outer end of the vent hole will become incrusted and clogged with salts, the battery will present anything but a neat appearance and other parts of the apparatus in which the battery is used will perhaps be attacked by the salts which fall off. In order to overcome these difficulties I propose to provide the cell with an antechamber or vestibule through which the gases may find easy escape but which will retain all the liquid, or semi-liquid which may ooze through the inner vent and the salts which may be formed about it.

Figure 1:
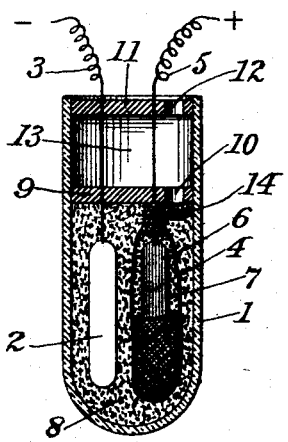
Figure 2:
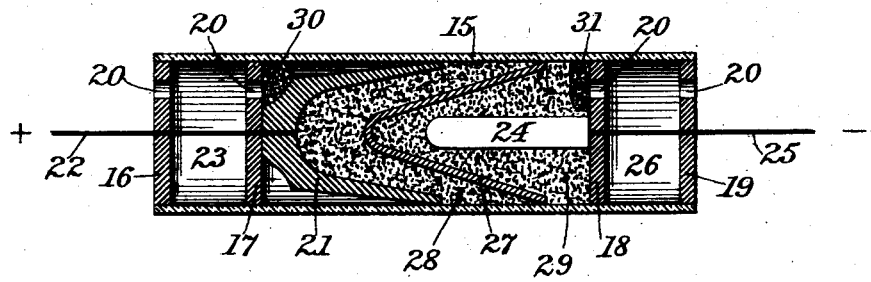

In the accompanying drawings: Figure 1 is a vertical central section of a single dry cell which is constructed in accordance with my invention; and Fig. 2 is a longitudinal central section through a cell of a form calculated to avoid difficulties which may develop in the use of the cell shown in Fig. 1.

Referring first to the cell shown in Fig. 1, the containing vessel 1 is shown as a glass or other suitable cup open at one end only. The electrolyte and electrodes placed within the cup do not concern my present invention, but I have shown a zinc-piece 2 having a wire 3 connected therewith and a carbon rod 4 connected to a wire 5 and placed within a porous sack 6, which is packed with a mercurous salt 7. The cup may be packed, around the electrodes, with asbestos 8 saturated with a suitable excitant fluid. The cup or jar 1 is not filled to the top but at some distance from the end receives a disk or stopper 9, of any suitable material, which fits snugly within the cup or jar and is provided with a vent-hole 10. At some distance from the first disk or stopper 9 and near the end of the container is a second disk or stopper 11, likewise provided with a vent-hole 12. Between the two stoppers 9 and 11 is formed a chamber or vestibule 13, which will retain whatever may exude from the vent 10 of the inner stopper. The wires 3 and 5 pass through both stoppers 9 and 11, as represented, and if necessary a plug or wad 14 of asbestos, wool or other suitable material might cover the inner end of the hole 10 to prevent a falling out of the looser material within the cell.

The cell represented in Fig. 1 will remain externally clean during its life, but it is capable of improvement in two respects. In the first place when the cell is overturned the pressure of accumulating gases will sometimes drive out more or less of the fluid or semi-fluid electrolyte into the vestibule, and in the second place a local circuit may be established by the dampness in the vestibule and the effective current of the cell be weakened. These difficulties are overcome by the arrangement shown in Fig. 2 in which the container 15 is a tube of glass or other suitable material open at both ends. A vestibule or chamber is formed at each end by the disks or stoppers 16, 17 and 18, 19, each having a perforation 20, and the two inner stoppers 17 and 18 inclose between them the active elements of the cell. As represented in the drawings one electrode 21 consists of a carbon cup having connected thereto the pole wire 22 which passes out through the stoppers 16 and 17 and the vestibule 23, while the other electrode consists of a zinc piece 24 having connected thereto the pole wire 25 which passes out through the stoppers 18 and 19 and the vestibule 26 at the other end of the cell. A porous cup 27 may be interposed between the two electrodes and any suitable excitant be employed, either as a viscid mass or as a fluid saturating an absorbent material, as indicated at 28 and 29. Plugs or wads 30, 31, may be placed over the perforations in the plates 17 and 18 to prevent loss of material.

In the cell just described there can be no short circuit within the cell on account of dampness in the vestibules, as the pole wires are at opposite ends of the cell. Furthermore, as the gases are not confined but will find free exit at one end or the other, the electrolyte will not be forced out (except by gravitation) and the holes in the inner stoppers will remain much longer without incrustation.

The vent-holes in the stoppers, in both constructions shown, are preferably disposed in line so that additional electrolyte may be inserted by means of a suitable syringe, whenever required, without taking the cell apart.

In the case of some cells in which, owing to their constituents, the generation of gases is small, the vestibule at one end (preferably at the end corresponding to the positive element) may be dispensed with.

I claim as my invention—

1. A galvanic cell having a chamber or vestibule formed in its end, the end walls of said vestibule being perforated, substantially as shown and described.

2. In a galvanic cell, the combination with the container, of stoppers fitted within the same near its end and spaced apart to form a chamber or vestibule, said stoppers being perforated, substantially as shown and described.

3. In a galvanic cell, the combination with a containing tube open at both ends, of stoppers to inclose the electrodes and electrolyte, and a second stopper at one end to form with the first stopper at that end a vestibule or chamber, said stoppers being perforated and the electrodes being connected to the outside pole wires at opposite ends of the tube, substantially as shown and described.

In testimony whereof I have signed my name to this specification in the presence of two subscribing witnesses.

LUIS DRESCHER.

Witnesses:
A. N. JESBERA,
A. WIDDER.